（12) United States Patent
Reuss et al.

(10) Patent No.: US 11,349,559 B1
(45) Date of Patent: May 31, 2022

(54) ACCURATELY DETERMINING A ROUND TRIP TIME TO A SATELLITE

(71) Applicant: Higher Ground LLC, Palo Alto, CA (US)

(72) Inventors: David Alexander Reuss, San Leandro, CA (US); Darren Robert Reis, Palo Alto, CA (US); Shmuel Shaffer, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 102 days.

(21) Appl. No.: 17/383,248

(22) Filed: Jul. 22, 2021

(51) Int. Cl.
*H04B 7/185* (2006.01)
*H04B 17/10* (2015.01)

(52) U.S. Cl.
CPC ..... *H04B 7/18519* (2013.01); *H04B 7/18513* (2013.01); *H04B 7/18515* (2013.01); *H04B 17/104* (2015.01)

(58) Field of Classification Search
CPC .................. H04B 7/185–18578; H04B 17/104
See application file for complete search history.

(56) References Cited

U.S. PATENT DOCUMENTS

| | | | | |
|---|---|---|---|---|
| 6,954,175 B1* | 10/2005 | Cox | ........................ | G01S 19/41 701/472 |
| 6,999,027 B1* | 2/2006 | Stockmaster | .......... | H04K 3/228 342/357.29 |
| 10,740,974 B1* | 8/2020 | Cowburn | ................. | G06T 19/20 |
| 2012/0108263 A1* | 5/2012 | Zhang | .................... | G01S 5/0221 455/456.1 |
| 2014/0194137 A1* | 7/2014 | Do | ........................ | H04W 24/00 455/456.1 |
| 2014/0200026 A1* | 7/2014 | Aldana | .................. | H04W 64/00 455/456.1 |
| 2016/0071325 A1* | 3/2016 | Callaghan | ............... | H04W 4/02 345/633 |
| 2016/0360362 A1* | 12/2016 | Do | .......................... | G01S 5/021 |
| 2021/0311199 A1 | 10/2021 | Reis et al. | | |
| 2021/0311203 A1 | 10/2021 | Reis et al. | | |
| 2022/0103976 A1* | 3/2022 | Gummadi | ............. | H04W 24/10 |

* cited by examiner

*Primary Examiner* — Raymond S Dean
(74) *Attorney, Agent, or Firm* — Behmke Innovation Group LLC; James M. Behmke; James J. Wong

(57) ABSTRACT

According to one or more of the embodiments herein, systems and techniques are provided for accurately determining a round trip time (RTT) to a satellite. In particular, a method according to one embodiment herein may comprise: receiving, at a device, a reference signal with a stable phase; measuring, by the device, a phase delta over time between the reference signal and an internal signal of an internal oscillator of the device; transmitting, by the device at a transmission time, a ranging signal toward a particular satellite; receiving, by the device at a reception time, a return of the ranging signal from the particular satellite; and determining, by the device, a round trip time (RTT) of the ranging signal that accounts for a phase drift of the internal oscillator between the transmission time and the reception time according to the measured phase delta over time.

20 Claims, 13 Drawing Sheets

LOCATION: A

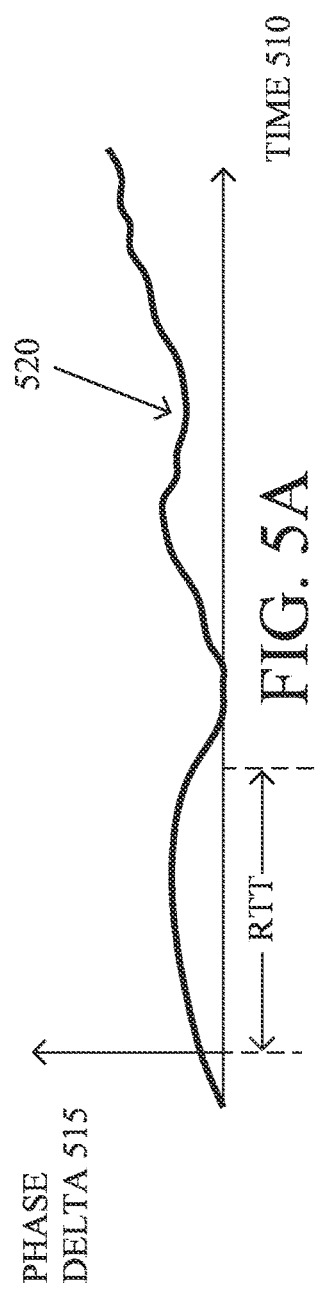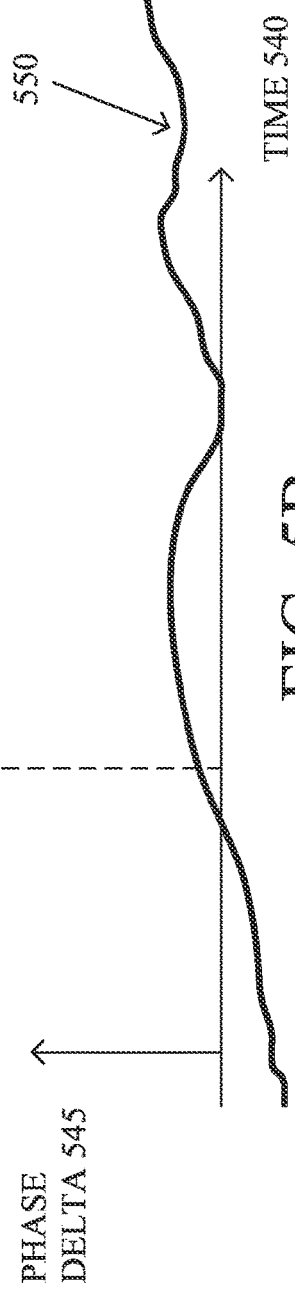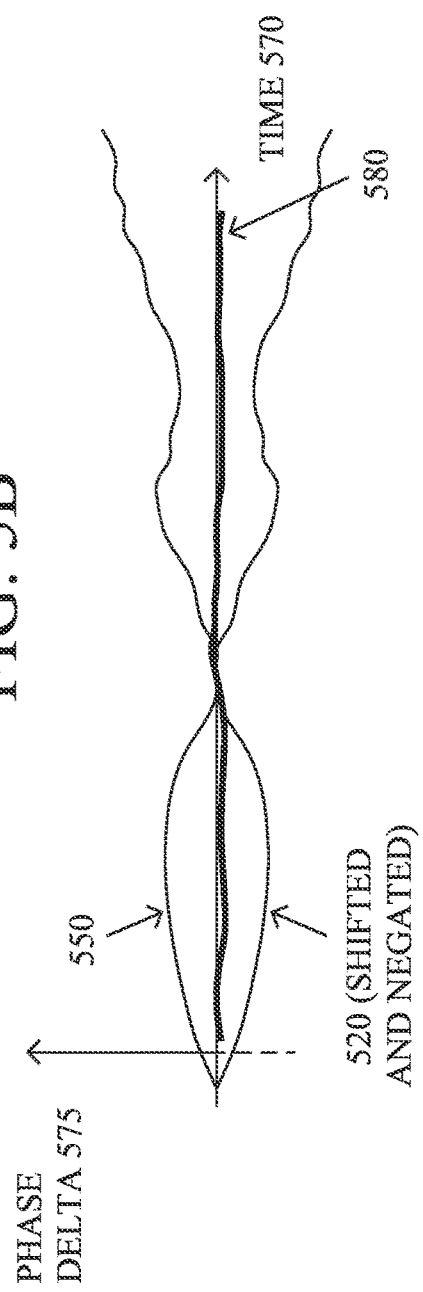

ACCURATELY DETERMINING A ROUND TRIP TIME TO A SATELLITE

TECHNICAL FIELD

The present disclosure relates generally to satellite communication systems, and, more particularly, to accurately determining a round trip time (RTT) to a satellite.

BACKGROUND

Global Navigation Satellite Systems (GNSS), such as the Global Positioning System (GPS) (also referred to as "global positioning satellites") in the United States, are systems wherein a mobile device is a passive device which receives signals from GNSS satellites and determines its own location based on the information encoded in the received signals as well as the time difference between the received signals. Though one of the benefits of this system is the fact that the mobile device does not need to transmit any signals, there are instances where such one-way signaling becomes insufficient or compromised (e.g., spoofed or jammed).

Conversely, alternative architectures have been suggested to provide a more resilient position, navigation, and timing (PNT) service (alternatively, precision navigation and timekeeping (PNT)) for both commercial and military purposes. For instance, a collection of commonly-owned, co-pending United States Patent Applications filed by Reis et al. on Feb. 26, 2021, including application Ser. No. 17/186,552 entitled "Satellite Echoing for Geolocation and Mitigation of GNSS Denial" and application Ser. No. 17/186,582 entitled "Satellite Relaying for Geolocation and Mitigation of GNSS Denial", the contents of each of which being incorporated herein in their entirety, provide a robust positioning and navigation system that is not prone to jamming or spoofing, which unlike existing GNSS systems (where the mobile device acts as a passive receiver), uses a mobile device's satellite transmission and reception capabilities (e.g., satellite echoing and/or relaying) to determine a position (geolocation) of the mobile device. That is, these techniques estimate the location of a mobile device based on determining a distance between the mobile device and numerous satellites, where the satellites may be communication satellites rather than dedicated GNSS satellites.

Certain environments employing this type of distance calculation, however, may be limited to instances where the mobile devices can receive a sufficiently strong signal from the satellites, such as where the mobile devices have appropriately licensed communication channels for the utilized satellites (e.g., higher-power transmissions). By not being able to compute an accurate distance to certain satellites (e.g., unlicensed satellites), the number of available satellites that may be used to determine the location of the mobile device may thus be greatly reduced.

SUMMARY

According to one or more of the embodiments herein, systems and techniques are provided for accurately determining a round trip time (RTT) to a satellite. In particular, a method according to one embodiment herein may comprise: receiving, at a device, a reference signal with a stable phase; measuring, by the device, a phase delta over time between the reference signal and an internal signal of an internal oscillator of the device; transmitting, by the device at a transmission time, a ranging signal toward a particular satellite; receiving, by the device at a reception time, a return of the ranging signal from the particular satellite; and determining, by the device, a round trip time (RTT) of the ranging signal that accounts for a phase drift of the internal oscillator between the transmission time and the reception time according to the measured phase delta over time.

In one embodiment, the RTT may be used to compute a distance between the device and the particular satellite, such as for determining a location of the device (or the satellite).

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate an example of compensation for phase/frequency shift of a local oscillator according to one or more embodiments of the techniques herein.

DESCRIPTION OF EXAMPLE EMBODIMENTS

As mentioned above, commonly-owned, co-pending U.S. patent application Ser. No. 17/186,552 entitled "Satellite Echoing for Geolocation and Mitigation of GNSS Denial" and Ser. No. 17/186,582 entitled "Satellite Relaying for Geolocation and Mitigation of GNSS Denial", and also U.S. patent application Ser. No. 17/186,730 entitled "Trilateration-Based Satellite Location Accuracy for Improved Satellite-Based Geolocation", filed by Reis et al. on Feb. 26, 2021, the contents of which also being incorporated herein in their entirety, utilize a location of communication satellites and measurement of round trip time (RTT) of an echoed signal sent from (or to) a mobile device via a satellite to (or from) a ground station and back. The RTT and the known speed of radio waves is then used to calculate the distance between the mobile device and the satellite. In certain embodiments, the location of the mobile device may be determined by measuring the RTT of echoed signals from different known satellites. In another embodiment, the precise location of the satellite may be determined (or confirmed) by measuring the RTT of echoed signals from different ground-based devices (mobile devices or ground stations) with known locations.

In one example embodiment, a mobile device transmits signals toward satellites using a power of approximately 9 decibel watts (dBW) spread over 4 megahertz (MHz) (−57 dBW/Hz). The signal is then frequency shifted and transmitted from the satellite back toward the ground. When a large antenna of the ground station (e.g., ~60 dBi, "decibels relative to isotropic radiator"] picks up this signal, the signal will have a cumulative carrier-to-noise ratio (C/N) of about −25 dB. Using for example a direct-sequence spread spectrum (DSSS) signal of spread factor 1023, as will be appreciated by those skilled in the art, this corresponds to an Es/N0 (energy per bit to noise power spectral density ratio) of +5 dB, which can be demodulated. As noted in the above-mentioned technology, when an echo reply is requested, upon receiving the request the ground station immediately replies by sending a message back to the originating mobile device.

Signals sent from a ground station (or signals echoed by the ground station) are sent with higher power of, for example, 50 dBW, and arrive at the mobile device with a cumulative C/N of about −10 dB, which may be de-spread with a factor 33 code to an Es/N0 of +5 dB, which is sufficient for the mobile device to receive and detect the signal originating from the ground station. Echoed signals which utilize a ground station, however, typically require a licensed communication channel on which the ground station receives the request from the mobile device and a reply communication channel. As noted above, the requirement to license a communication channel limits the number of satellites that can be utilized for the location determination.

Figure 1:
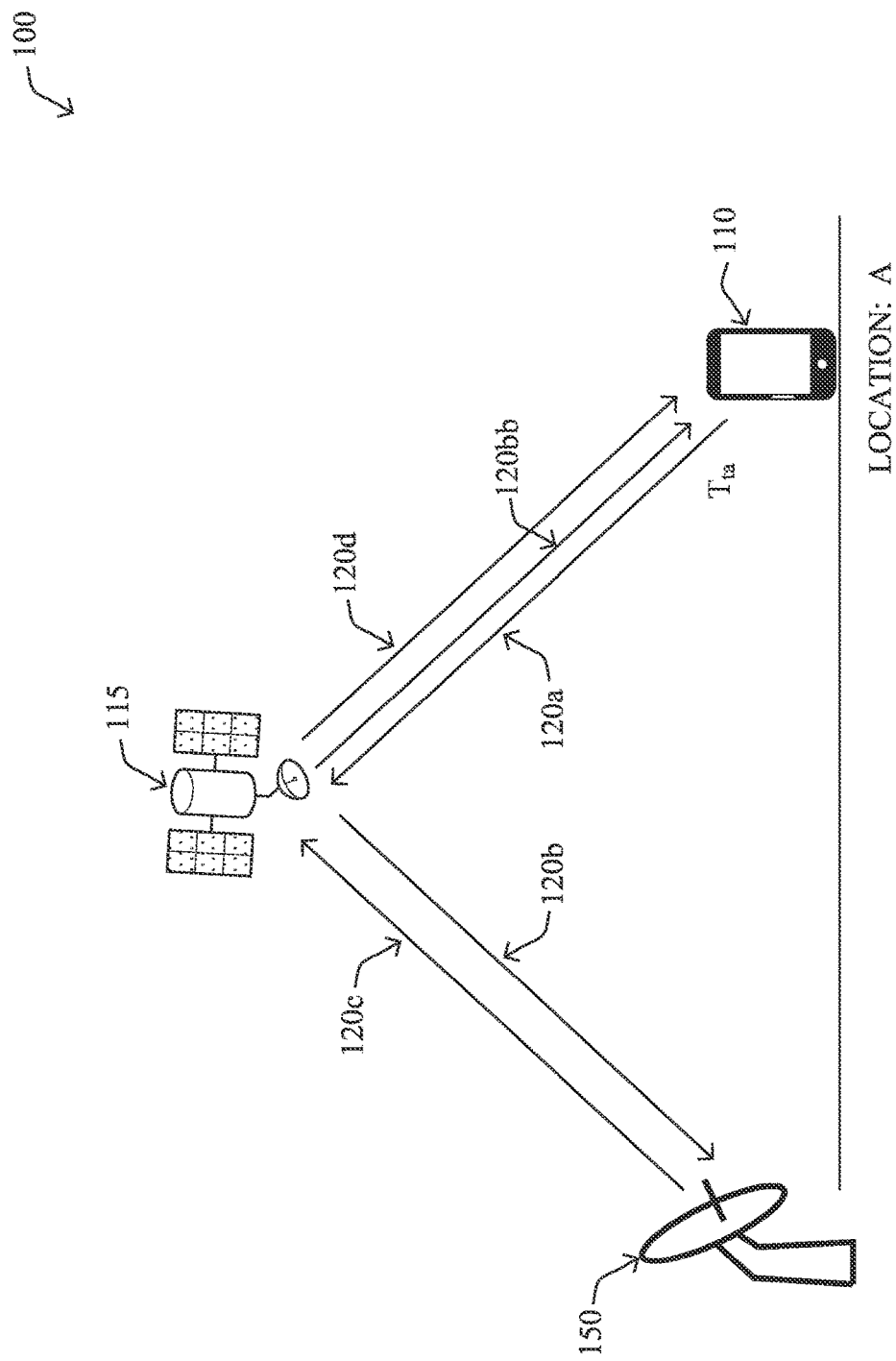
FIG. 1 illustrates an example of a satellite communication environment.

Referring to environment 100 of FIG. 1, signals 120*a* sent from a mobile device 110 toward any satellite 115 (licensed or unlicensed satellites, operating in a bent-pipe manner) are frequency shifted and transmitted back toward the ground by the satellite 115 (such as geostationary satellites, geosynchronous equatorial orbit (GEO) satellites, medium earth orbit or (MEO) satellites, or low earth orbit (LEO) satellites). This signal arrives at the associated ground station 150 as signal 120*b*. When the mobile device uses a licensed communication channel, the ground station uses its large antenna to receive the signal and detect the messages encoded in the signal. In addition, the same frequency shifted signal transmitted from the satellite towards the ground is also received by the mobile device 110, shown as signal 120*bb*. Note that this signal 120*bb* is received by the mobile device regardless of whether the mobile device licensed a communication channel on the specific satellite 115, essentially overhearing the transmission of signal 120*bb* by the satellite toward the ground station 150. (In a licensed environment, a returned message, such as an echoed message or other reply, may be returned from the ground station 150 as message 120*c*, which may then be reflected by the satellite 115 to the mobile device 110 as relayed message 120*d*.)

Figure 2:
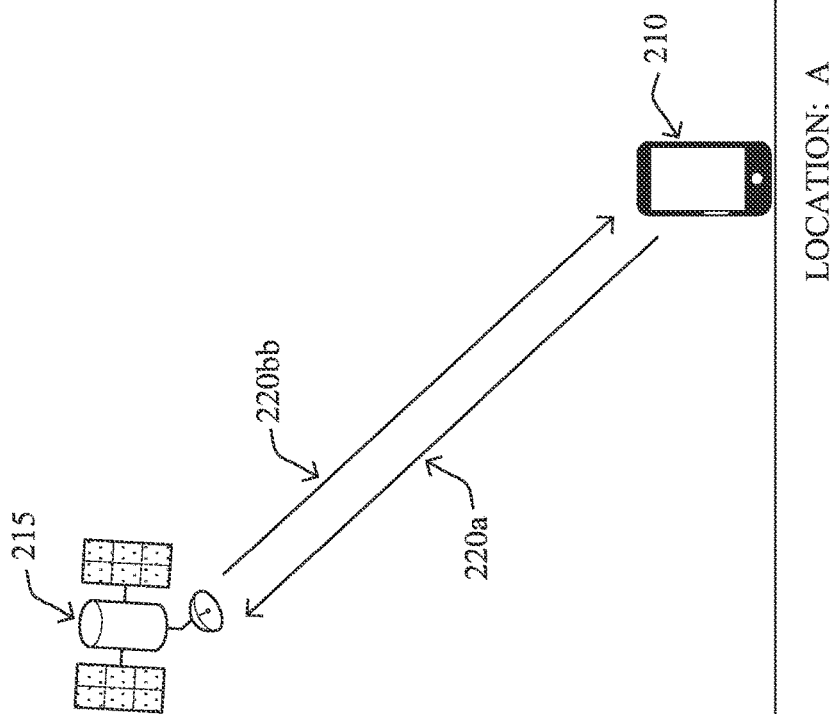
FIG. 2 illustrates another example of a satellite communication environment specifically highlighting echoed messages.

Notably, the signal 120*bb* received from the satellite on the backward path (from any satellite to the ground station) is received by the mobile device with a power which is often too small to be detected by most receivers of mobile devices (e.g., because of the small aperture/low gain antenna of the mobile device). Referring now to FIG. 2, therefore, the ability to determine the RTT of a signal 220*a* sent from a mobile device 210 towards a satellite 215 and then frequency shifted and transmitted as signal 220*bb* back to the mobile device depends on the ability of the mobile device 210 to detect the weak signal that originates at the mobile device.

Figure 3:
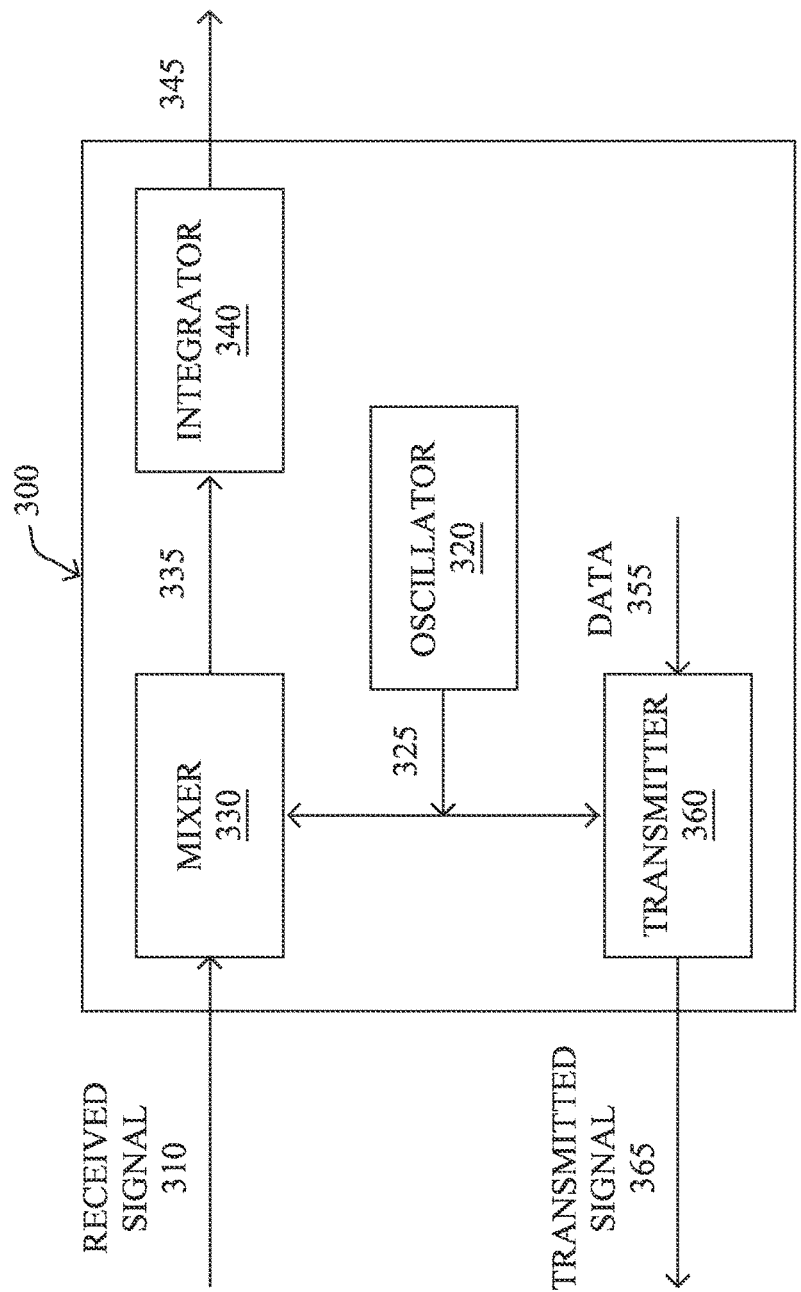
FIG. 3 illustrates an example of a transmitter/receiver.

Referring to FIG. 3, a simplified block diagram of a transmitter/receiver 300 described. The device utilizes an oscillator 320 which generates a signal 325 with a given frequency. When the mobile device transmits data 355, the transmitter 360 uses the signal 325 from the oscillator 320 to modulate the data 355 and transmits it as signal 365 towards the satellite, e.g., satellite 115 or 215 of FIG. 1 or 2. As explained above, the satellite shifts the frequency of the signal and sends it downward towards the earth. The mobile device receives this signal 310 from the satellite (though illustratively intended for a ground station), and mixes it in the mixer 330 along with the signal 325 from the oscillator 320. The resulting signal 335, however, may be too weak to be detected. Therefore the weak signal 335 may be fed into the integrator 340 which attempts to enhance the output signal 345 by integrating it over a long time period of time e.g., 10-20 seconds, or more.

Due to practical cost considerations, however, most mobile devices utilize a low-cost oscillator whose frequency drifts with time. Because of the phase and frequency drift, the phase and frequency that was used to modulate the data by the transmitter 360 at time "t0" is different from the frequency of the oscillator at time t0+RTT, rendering the integration of the received signal useless.

The techniques herein, therefore, provide for accurately determining a round trip time (RTT) to a satellite, such as for use in determining a distance for positioning and navigation systems or otherwise, by using an enhanced receiver that accounts for the phase drift of a local oscillator. In particular, as described in greater detail below, the techniques herein enable a mobile device to successfully integrate the received signal despite the fact that the phase of the signal 335 drifts because of the use a low cost semi-sable oscillator. To allow this process, the device uses phase-stable satellite-transmitted reference signals (e.g., with pilot symbols) to find the local oscillator's phase drift over time (phase drift or trajectory). Next, the techniques herein apply that phase drift to the returned very low-power (very low-SNR) ranging signals (i.e., to account for or negate the phase drift) to obtain a satisfactory correlation peak between the received ranging signals integrated over a long time window, and thus to determine a precise RTT.

Figure 4A:
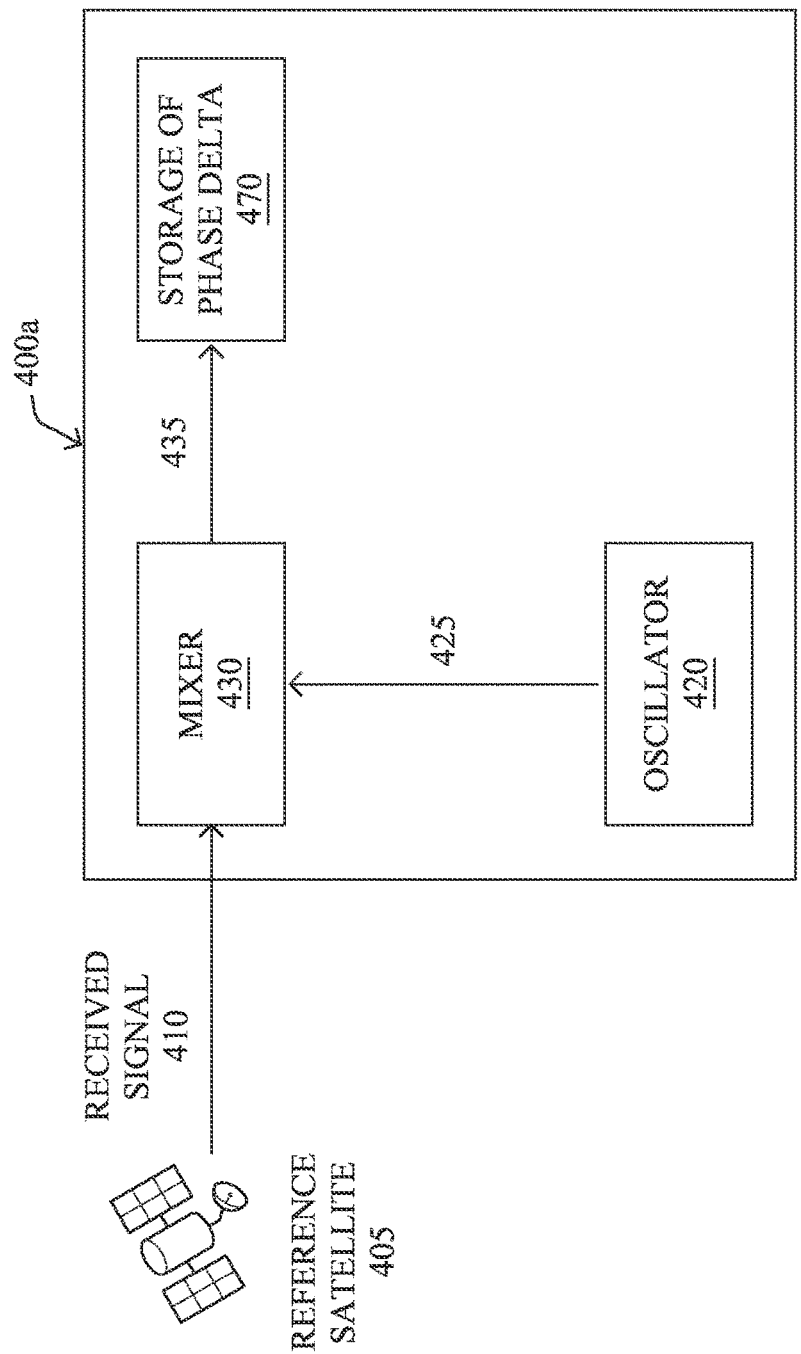
FIGS. 4A-4B illustrate an example of an enhanced transmitter/receiver for accurately determining a RTT to a satellite in accordance with one or more embodiments herein.

Operationally, and with reference to FIG. 4A showing a simplified component 400*a* of the enhanced receiver, a reference signal 410 may be received from a satellite 405 that includes a reference signal with a stable precise frequency. The receiver, however, includes a local oscillator 420 (e.g., a low-cost oscillator, similar to 320 in the example above) whose frequency may drift with time. According to the techniques herein, therefore, the output signal 425 from the oscillator 420 is mixed at mixer 430 with the received reference signal 410 to produce as output 435 a time series of the phase difference between the signals as well as an indication of the frequency difference between the signals. This time series (output 435) is stored in the storage of phase delta memory 470.

Said differently, a received reference signal 410 has a series of pilot symbols of known phase embedded in its signal. After demodulating the reference signal using the local oscillator, the techniques herein can then compare the perceived phase of these symbols with their predetermined phase sequence. Any deviation between the perceived phase and the predetermined phase sequence can be attributed to phase drift of the local oscillator 420, and this phase drift is stored in memory (470). (Note that as described below, this process is generally simultaneous with receiving an echo signal 120bb so that phase drift measurements can be directly applied to the 120bb signal, accordingly.)

Figure 4B:
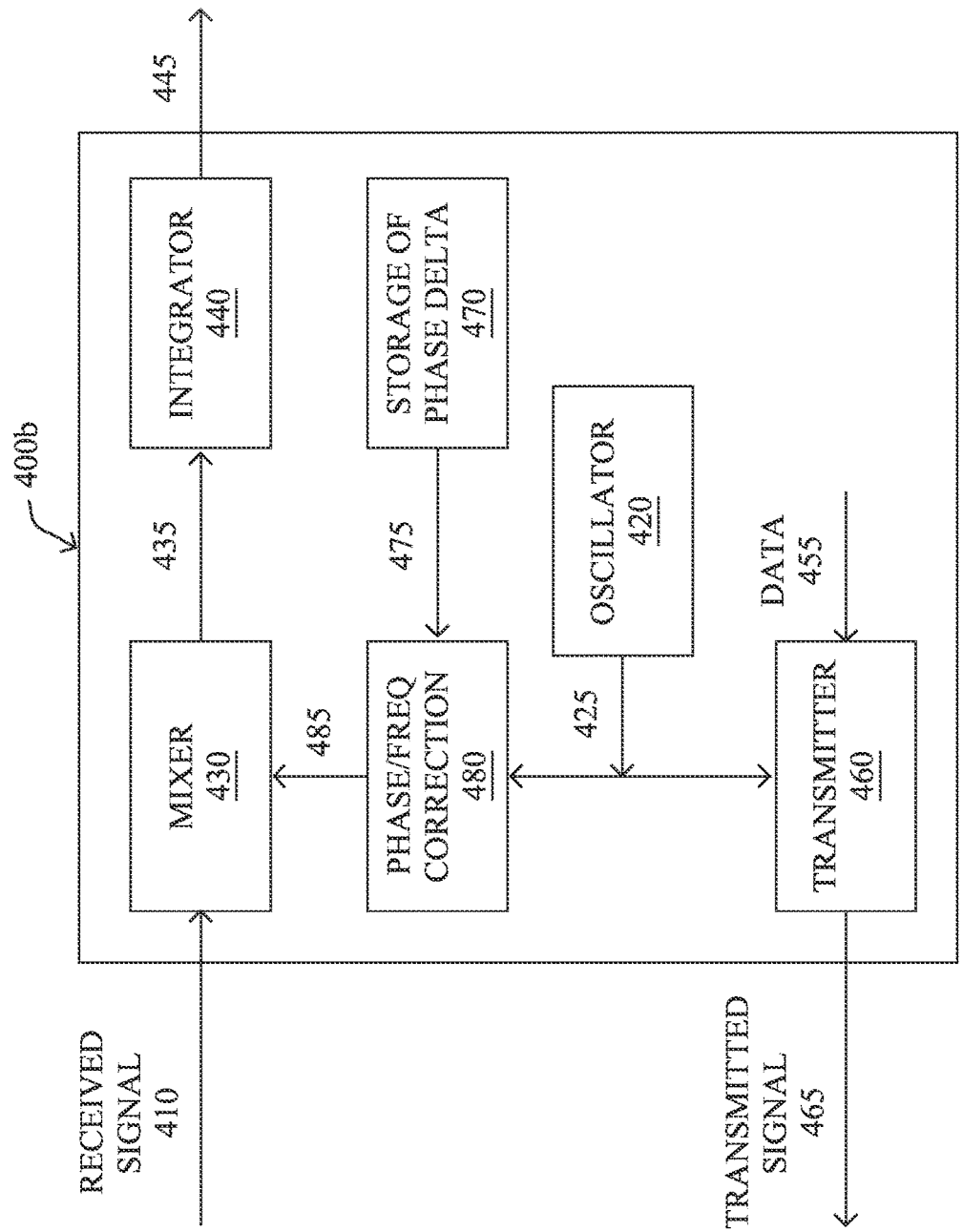

Turning now to FIG. 4B, a simplified block diagram in shown for how the stored series of phase delta above is utilized by an enhanced transmitter/receiver ("device") 400b according to the techniques herein. For instance, similar to the operations of the transmitter/receiver 300 of FIG. 3, the transmitter 460 transmits data 455 as signal 465 (e.g., signals 120a/220a above) based on the signal 425 from local oscillator 420, but here, as mentioned above, the local oscillator has a frequency that may drift with time. As such, after a satellite receives the signal 465 and reflects it (e.g., toward an associated ground station as signals 120b/220b), the receiver 400b of the mobile device receives the reflection (which is frequency shifted by the satellite) as signal 410 from the satellite, i.e., as an echoed signal from the satellite (e.g., signals 120bb/220bb above). As noted above, however, due to the frequency drift of the local oscillator 420, there is a phase difference between the time of reception verses the time of transmission of the signal, which makes it impractical (e.g., impossible) to coherently integrate the received signals over a relatively long period of time for determining the RTT.

Note also that because of the very low signal-to-noise ratio (SNR), it is impossible to detect the signal and the RTT based on a single packet. The solution could have been to enhance the power by integrating the signal over a relatively long period of time. However, simple integration would not work because of the frequency/phase drift. That is, the drift of phase would cause the integration to fail. As such, part of the solution herein is to align the received signals so that they all have the same (similar) phase to thus facilitate a desired result based on the integration.

According to the techniques herein, in one embodiment, this returned signal 410 may also include the reference signal as discussed above with reference to FIG. 4A (pilot symbols of known phase). That is, in this embodiment, the needed phase-stable reference signal is obtained from the same satellite echoing the returned ranging signal (i.e., both signals are coming from the same source, but as different signals). In another embodiment, however, the stability information from a different satellite's reference signal (e.g., embedded in the forward path of a licensed satellite or otherwise) may be used to track the phase drift at the same time as the echoed signal is being received. (For instance, another satellite's forward path reference signal may be within the beam of either a singular receive antenna or in an alternative embodiment a split or separate antenna (i.e., a two-antenna system), and then the techniques herein could use that downlink for phase correction while listening for the echoed signal coming from a different satellite.) As explained in greater detail with reference to FIG. 4A above, regardless of the source of the phase-stable reference signal (so long as it is a trusted source), the receiver uses the phase-stable reference signal received at the same time as the echoed signal to determine and store the time series of the phase delta 435 in the storage of phase delta 470.

A delayed/shifted version of the phase delta time series 475 may now be used by the phase/frequency correction module 480 to adjust the phase of the oscillator signal 425. In particular, when the delay that the system uses exactly matches the RTT between the mobile device and the satellite, the stored phase delta time series perfectly adjusts the phase of the decoding signal 485 and aligns it with the phase of the modulating signal 425 at the time of transmission (RTT seconds earlier). When this occurs, the phases of the signals at the output 435 of the mixer 430 align, thus enabling the integrator 440 to accumulate and enhance the received signal into output 445 during the integration time window.

Initially, the techniques herein may start with an estimate of the delay between the mobile device and the respective satellite based on the altitude at which the satellite flies and a roughly approximated location of the mobile device. For example, for a GEO satellite, the initial altitude may be 35,786 km, and the RTT of an echoed radio signal (to and from) is about:

$$RTT=2*35{,}786\ km/300{,}000\ km/sec=0.23857\ sec \qquad \text{Eq. 1.}$$

Note that the actual distance between the mobile device and the satellite is different, but the altitude in which the satellite flies is a good first approximation for an RTT.

In accordance with yet another example implementation, the techniques herein may use an approximated location of the mobile device and use that approximated location to determine the angle between the line of sight (LOS) to the satellite and the horizon. The system herein may then start with an estimate of the delay between the mobile device and the respective satellite to be the altitude at which the satellite flies divided by sin α, where α is the angle between the LOS to the satellite and the line towards the horizon. In accordance with this specific implementation, for an illustrative GEO satellite, using the result from Eq. 1, the initial RTT may be set to:

$$RTT=0.23857\ sec/\sin\alpha \qquad \text{Eq. 2.}$$

It should be noted that though FIG. 4B describes a specific implementation wherein the phase compensation/correction 480 is applied to the slowly drifting oscillator signal 425, those skilled in the art should recognize that the present disclosure covers also the implementation wherein the phase compensation/correction is applied to the received signal 410. (Not shown for sake of simplicity.)

FIGS. 5A-5C provide a simplified illustration of the compensation for the phase/frequency shift of the local oscillator according to one or more embodiments of the techniques herein.

Illustratively, starting with FIG. 5A, the x axis 510 provides the time at which a specific measurement of the phase delta between the reference signal and the local oscillator was measured. The magnitude of the phase delta is provided using the y axis 515. The curve 520 illustrates an example of a time series of a phase delta, e.g., phase delta 435 of FIG. 4A, measured at various times. As explained above in greater detail, the frequency from the local oscillator is used to modulate the information as part of the process of transmitting the message from the mobile device towards a satellite.

FIG. 5B, on the other hand, illustrates a time series of the phase delta in the received echoed signal at the mobile device receiver from a signal such as signals 120bb or 220bb of FIGS. 1 and 2. The x axis 540 provides the time at which a specific measurement of the phase delta between the reference signal and the modulating signal of the received signal. The magnitude of the phase delta is provided using the y axis 545. The curve 550 illustrates an example of a time series of the phase delta at various times. As can be seen from FIGS. 5A and 5B, the curve 550 is substantially identical to curve 520 shifted by a delay of RTT seconds.

Now, according to the techniques herein, when curves 520 and 550 are aligned by the appropriate RTT difference as described herein (e.g., by delaying the stored curve 520 to "fit" the curve 550), FIG. 5C thus illustrates the desired phase delta between the compensated oscillator phase and the phase of the signal that modulated the received echo message, such as messages 120bb or 220bb RTT seconds earlier. The x axis 570 provides the time at which a specific occurrence of the phase delta between the compensated oscillator signal and the modulated signal of the received signal RTT seconds earlier. The magnitude of the phase delta is provided using the y axis 575. The curve 580 illustrates an example of a time series of the phase delta at various times. Given the fact that the goal of the compensated phase is to be substantially the same as the phase of the signal that modulated the echo message RTT seconds earlier, the magnitude of the phase delta 580 is rather small in the ideal arrangement.

In accordance with one example embodiment, the RTT is estimated by changing the estimated RTT and evaluating the curve 580. The delay that yields the smallest amplitude (deviation from the x axis) is determined to be the estimated RTT. For example, one specific implementation is determined by summing the absolute values of the curve 580. In accordance with another example implementation the deviation is measured by summing the squared values of the curve 580 over a predetermined length of time.

The delay that yields the lowest deviation from the x axis is determined to be the estimated RTT.

In accordance with a second embodiment, the small delta achieved above thus is used to facilitate a meaningful integration of the signal at the output of the mixer 430 by the integrator 440 above, for use in determining the RTT accordingly. That is, the output of the integrator 440 produces a spike in correlation magnitude such as the ones illustrated in FIGS. 6A-6B.

Figure 6A:
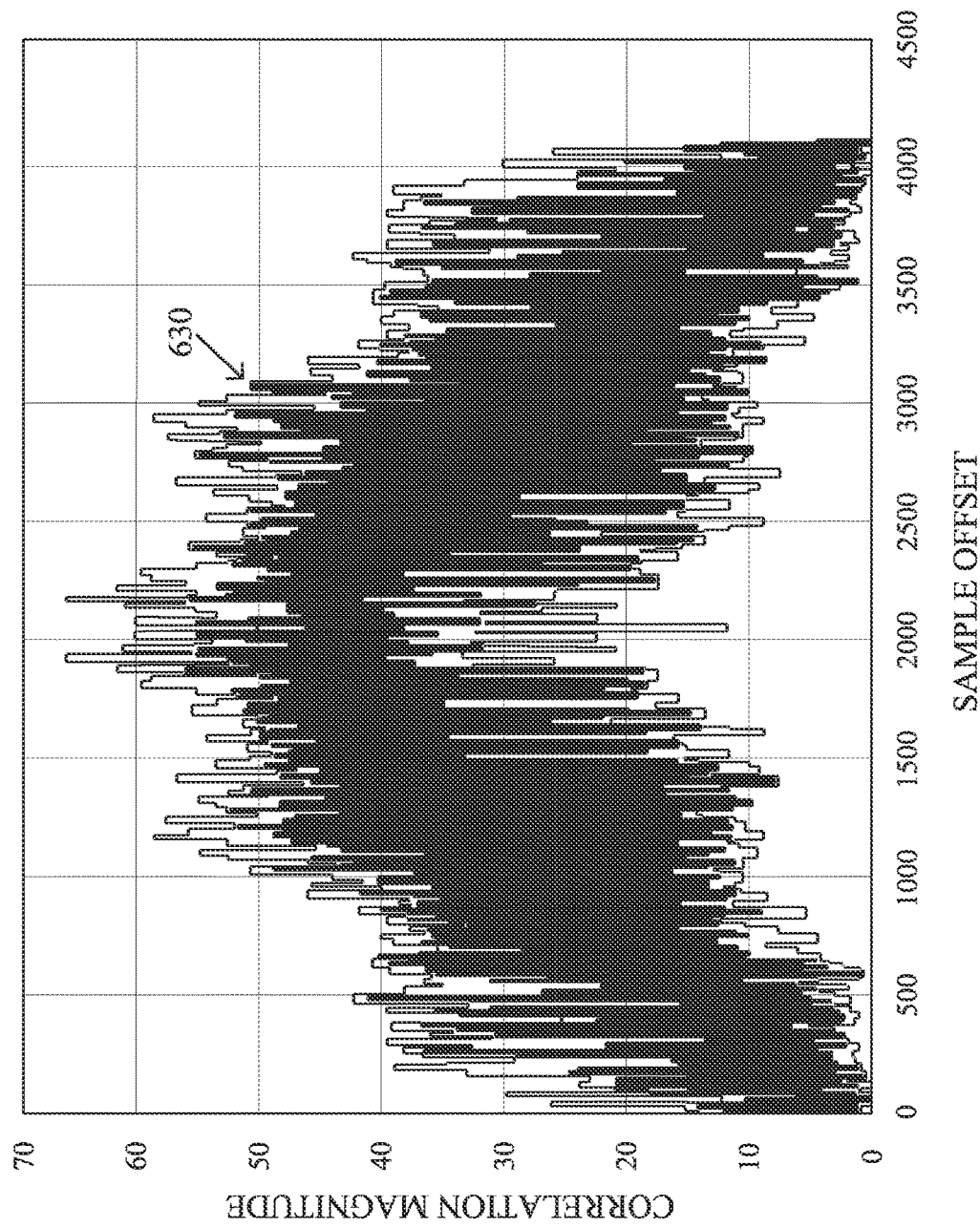
FIGS. 6A-6B illustrate examples of outputs of an integrator indicative of the cross correlation between a compensated oscillator output and a received signal in accordance with one or more embodiments herein.
Figure 6B:
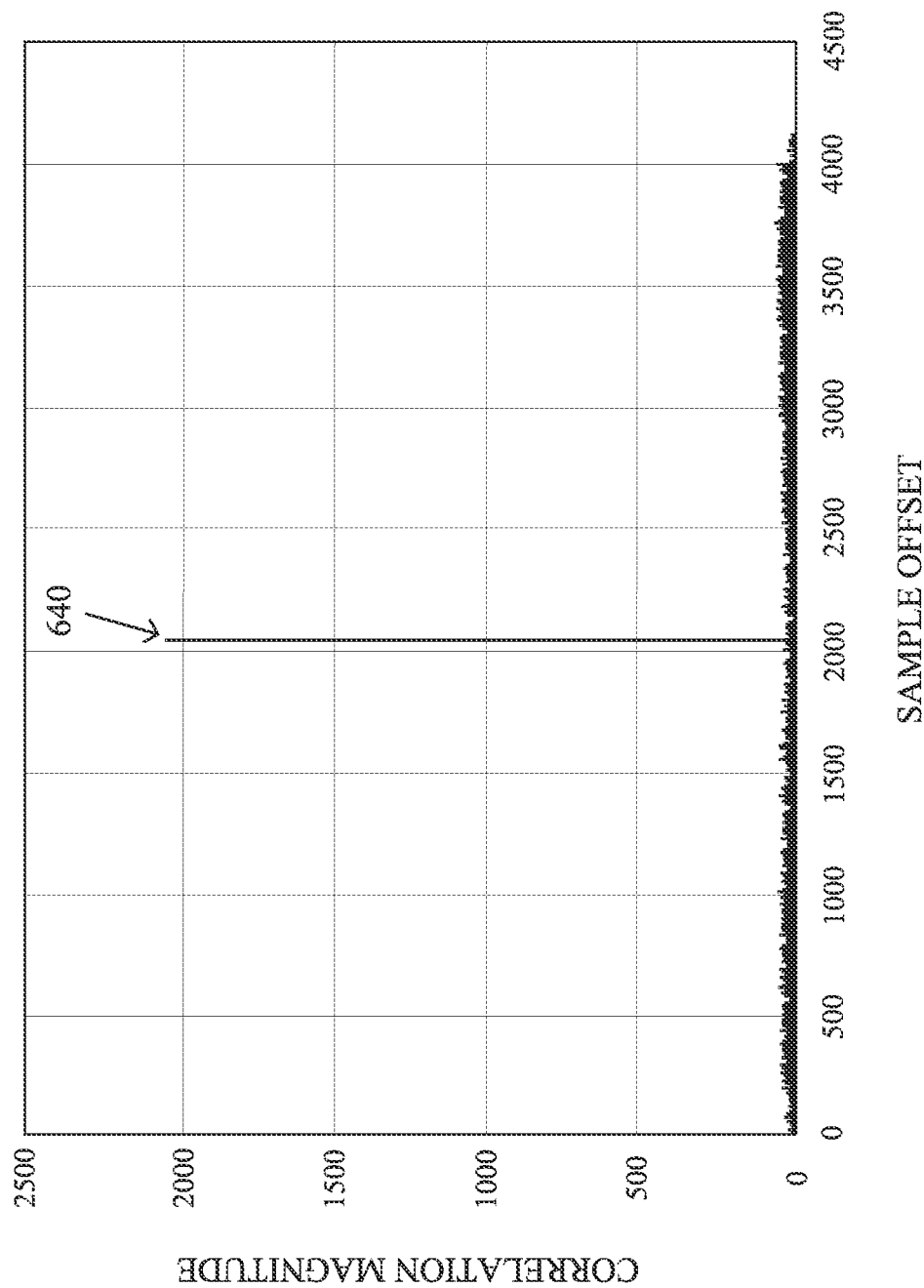

FIGS. 6A-6B, in particular, provide a simplified illustration of the output of the integrator indicative of the cross correlation between the received echoed signal during the long period of the received signal integration. FIG. 6A, for instance, illustrates cross correlation 630 based on an initial estimate of RTT, e.g., such as described above in Eqs. 1 and 2. It should be noted that these equations are brought only for illustration purpose and without limitation; other initialization methods are contemplated and covered by the present disclosure. As can be seen, the peak of the curve provides some information about the RTT however the closer the cross correlation peak is to the noise floor, the bigger the ambiguity (or the lower is the certainty) of the RTT estimation.

The system herein refines the estimate of the RTT by estimating the time in which the curve peaks. For instance, the estimate may be based on the highest number, based on curve fitting, or based on any other method for determining a maximum of a correlation curve. The refined estimate of the RTT is used then to shift the phase delta by the newly obtained RTT estimate, resulting eventually in a narrower cross correlation curve 640 such as the one illustrated in FIG. 6B. That is, the system may keep looping, using the estimated RTT from the previous cycle, until the cross correlation curve meets specific criteria, or until the improvement in determining the RTT accuracy by an additional adjustment of the delay is negligible.

Figure 7A:
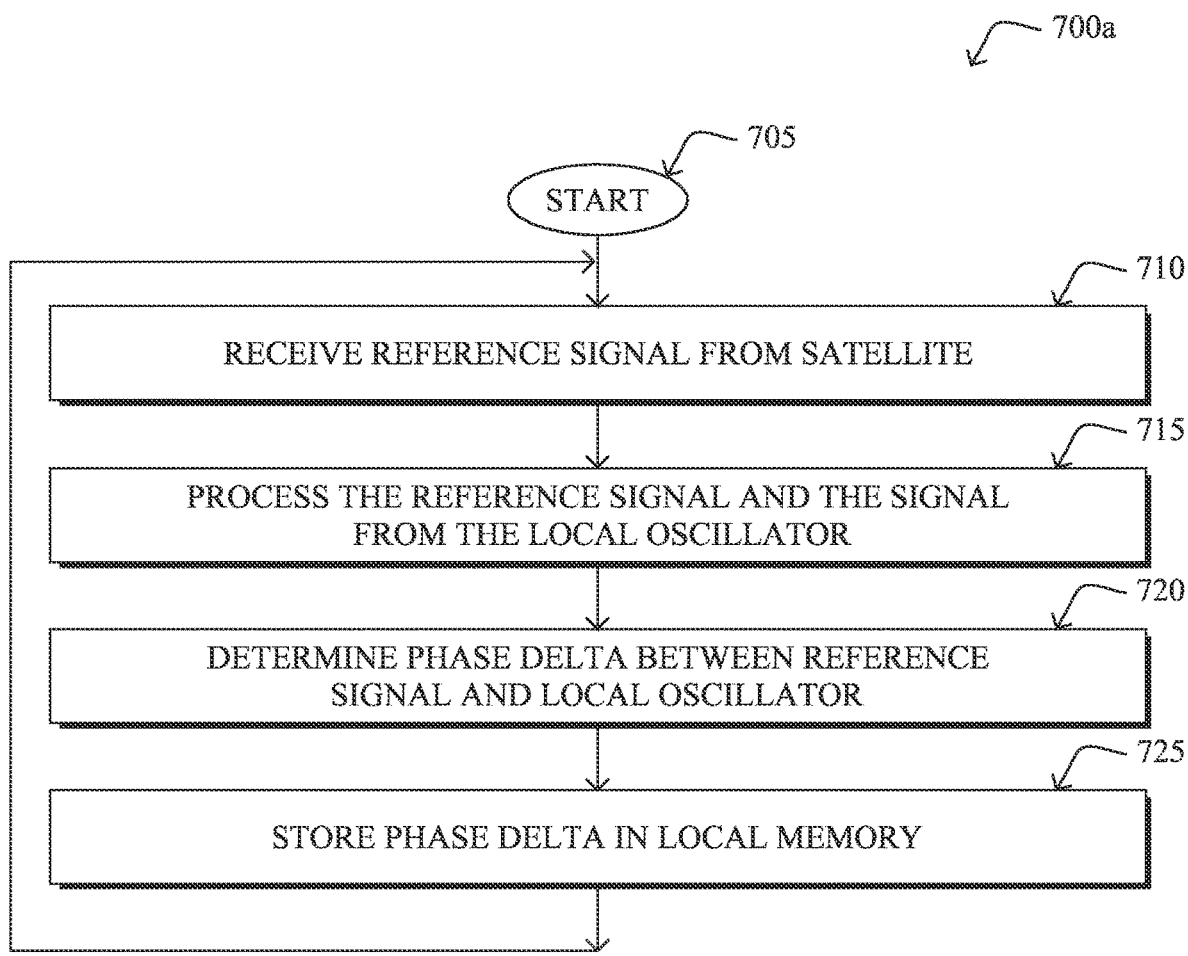
FIGS. 7A-7B illustrate example flowcharts for procedures for determining the phase drift of a local oscillator and for determining the round trip time (RTT) to a specific satellite in accordance with one or more embodiments herein.

To describe in greater detail how the system herein determines the phase drift of the local oscillator, FIG. 7A provides a simplified flowchart for an illustrative procedure 700a, which starts in operation 705 and proceeds to operation 710 where the device, such as a mobile device (e.g., device 110/210 above) receives a reference signal from a satellite, which may be a licensed satellite, or in certain embodiments may be an unlicensed satellite. Note that the procedure 700a may occur continuously, or may be triggered based on (e.g., at the time of, or immediately preceding, transmission of a ranging echo message).

In operation 715 the received reference signal is mixed/processed with a signal from the local oscillator. In operation 720, the techniques herein determine the phase shift of the local oscillator with respect to the reference signal (which is assumed to have a stable frequency/phase) based on the result of the processing performed in operation 715. Operation 725 stores the phase delta which is measured periodically, e.g., every 10 milliseconds. In accordance with one example implementation the method utilizes a buffer (e.g., a ring buffer) capable of storing certain length (e.g., 500 milliseconds) of phase delta samples. Once the buffer storage fills up, the system herein proceeds to overwrite the oldest information with the newest information. In accordance to another example implementation, the size of the buffer is determined as to ensure that the storage is large enough to store phase delta samples for duration longer than the RTT to the furthest satellite that the method may utilize.

Figure 7B:
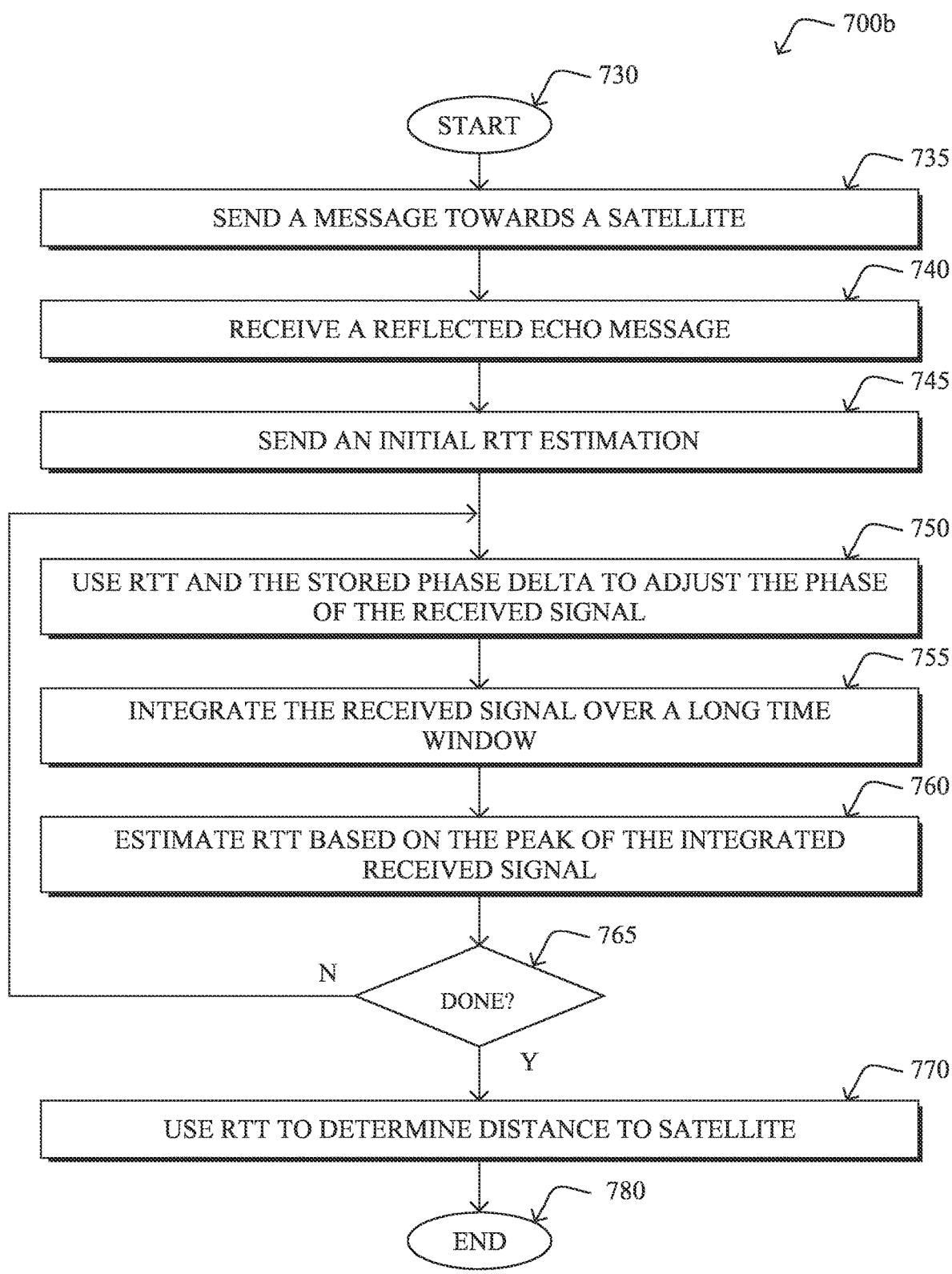

Additionally, FIG. 7B, provides a simplified flowchart for a further procedure 700b for determining the RTT to a specific satellite. The procedure 700b starts in operation 730 and proceeds to operation 735 where the device (e.g., mobile device 110/210) sends a message towards a satellite (e.g., 115/215), which may be a licensed or unlicensed satellite. A reflected message (e.g., 120bb/220bb) is then obtained from the satellite in operation 740. As explained above, the reflected message is a delayed sent message which has been frequency shifted by the satellite before being sent downwards by the satellite.

According to one embodiment of the present disclosure, operation 745 sets an initial RTT value which (as explained in greater detail above) is an estimated value that may be based on an expected RTT according to flight altitude of the satellite and/or based on the angle of transmission towards the respective satellite. In operation 750 the system herein utilizes the initial RTT and the stored phase delta time series to determine the phase delta that should be used for adjusting the phase of the received signal at any moment. The phase-adjusted received signal is then used by operation 755 to integrate the received signal. The integration is a critical step that enables very low signal to be added and detected. (Note that the phase adjustment is another critical step that ensures that the integrated signals are actually resulting in adding the signals over time rather than averaging it to zero.)

Operation 760 determines the time in which the received integrated signal achieves its peak. As noted, the determination can be done based on simple peak determination, based on curve fitting and determining the peak of the fitted curve, or any other peak determination method. Initially, when the RTT estimation is not accurate, the output of the integration process results in a curve like the one provided by FIG. 6A above.

The procedure 700b proceeds to a decision operation 765 where the method determines whether the RTT estimation is sufficient ("good enough"). In accordance with one implementation the method determines the variance of the RTT distribution and determines that the estimation is good enough if the variance is smaller than a predetermined value. In accordance with another example implementation the method determines the improvement in the estimation based on the peak of the maximum, the reduction of the variance, the variation in the estimated RTT between multiple iterations being smaller than a predetermined threshold, etc., and determines that the RTT estimation process is done when the improvement is smaller than a predetermined value.

If the operation determines that the process of improving the RTT estimation is not done, the procedure loops back to operation 750 where the process of adjusting the phase of the received signal etc., is repeated, and a new estimation of the RTT is obtained.

However, if in step 765 the operation determines that the process of improving the accuracy of the RTT is done, the method proceeds to operation 770 where the estimated RTT may be used to determine the distance between the mobile device and the identified satellite (e.g., half of the RTT, less any determined/known/assumed processing delays incurred by the satellite during reflection of the echo message, as it is critical to remove any delay from the round trip flight time that is not associated with actual flight time of the signals through air and space).

The procedure then illustratively ends in operation 780.

Notably, the RTT (and more particularly the distance computed based on the RTT) may be collected by a mobile device from a plurality of different satellites for use in determining the location of the mobile device, such as described in greater detail in the abovementioned US patent disclosures. That is, as mentioned above, the RTT and the speed of radio waves may be used to either calculate the distance between the mobile device and a plurality of satellites (e.g., trilateration), or in another embodiment, a plurality of distances to known ground locations to a single satellite may be used to determine (or confirm) the precise location of that satellite. Other uses of the RTT and/or distance to one or more satellites may also be used herein, and those mentioned are merely examples for illustration.

Note also that the techniques above assume that the mobile device is stationary between transmission and reception of the echo message, but in certain embodiments herein, the device may also determine any distance it traversed during the echoed message flight time. That is, the system herein may also utilize an accelerometer or similar relative positioning sensor to determine any distance traveled by the mobile device while the radio signal was in flight, and may fuse in any distance traversed during by the mobile device during the radio signal flight.

Furthermore, as used herein, the term "echo" references the fact that a message initiated from a transmitting device is returned to that transmitting device. However, as will be appreciated by those skilled in the art based on the description herein, an "echoed message" may be altered along its transmission path by intermediate devices in one way or another. For instance, as described herein, a communication satellite may be described as receiving and returning a message, but in detail the satellite may alter one or more signal transmission properties of the received message, such as by mixing the received signal with a signal from another oscillator, such that the "echoed message/signal" is returned over a different frequency band than the received frequency band (e.g., the incoming frequency band is different than the returned frequency band). Also, intermediate devices may insert additional data into the echoed messages, such as entering one or more delay values, or may generate an entirely new message to return in response to a received message. Accordingly, the terms "echo", "echoed", "echoing", etc., are not meant to be limiting to the scope of the present disclosure, and are merely meant to imply that a message initiated by an initiating device results in a returned message to (or overheard by) that initiating device per one or more of the embodiments of the techniques herein.

Figure 8:
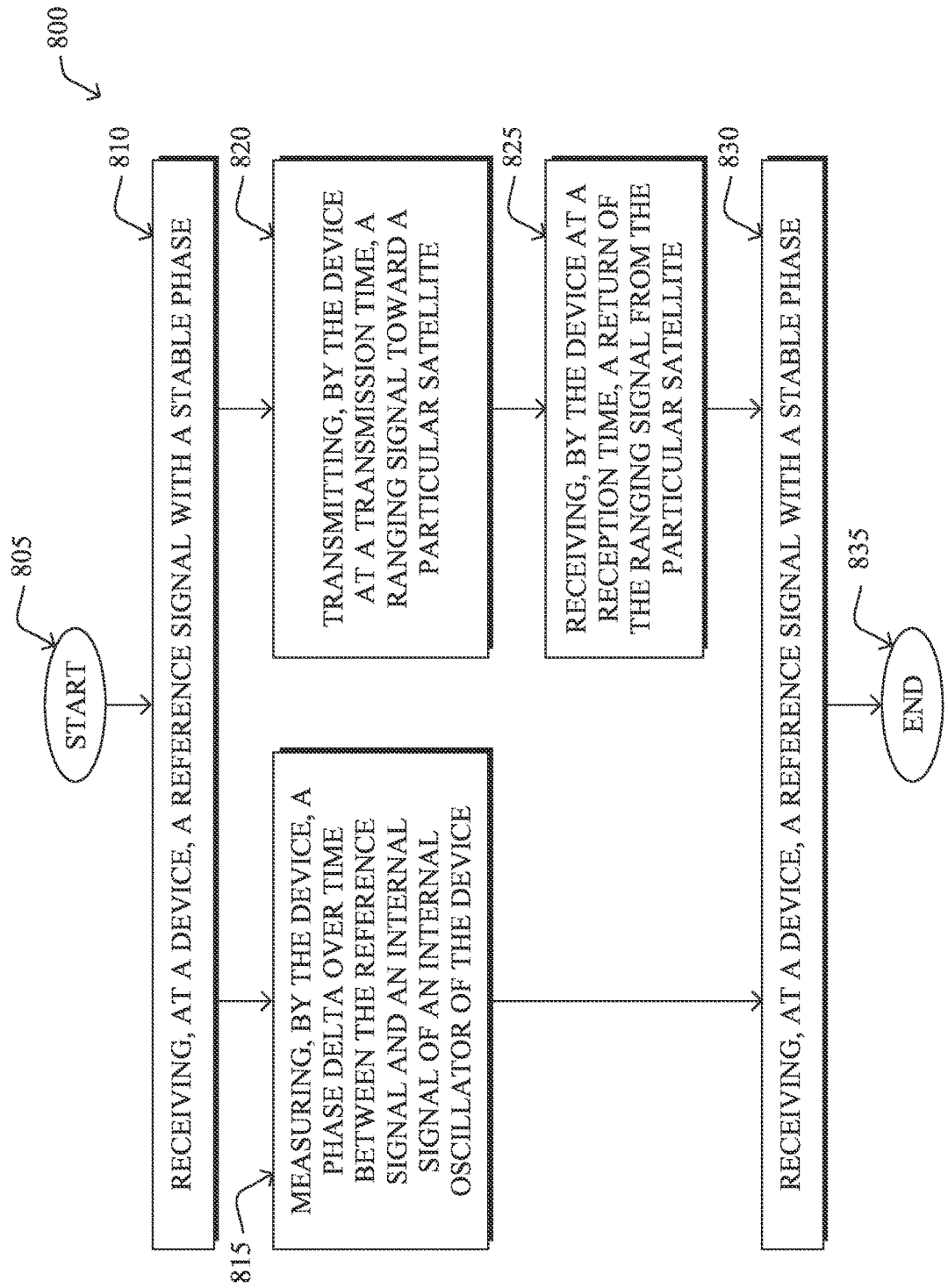
FIG. 8 illustrates an example of a flowchart for a procedure for accurately determining a RTT to a satellite in accordance with one or more embodiments herein.

In closing, FIG. 8 illustrates an example simplified procedure 800 for accurately determining a round trip time (RTT) to a satellite in accordance with one or more embodiments described herein. For example, a non-generic, specifically configured device (e.g., mobile device 110/210) may perform procedure 800 by having a processor execute stored instructions (e.g., a process) on the device (e.g., in a memory). The procedure 800 may start at step 805, and continues to the following steps, as described generally in greater detail above.

In particular, in step 810, the device receives a reference signal with a stable phase, such as from a reference satellite (e.g., a licensed satellite, an unlicensed satellite, a GNSS satellite, a beacon message, a ground-based source, and so on).

In step 815, the device may then measure a phase delta over time between the reference signal and an internal signal of an internal oscillator of the device. Note that measuring the phase delta over time may occur continuously or the device may trigger the measuring of the phase delta over time to cover at least an estimated length of time between the transmission time and the reception time. Also, as noted above, the device may store the phase delta over time as a time series within buffer such as for example a ring buffer (e.g., which is longer than an anticipated RTT to a furthest reachable satellite). (Note that this step continues concurrently with steps 820 and 825 below. That is, this step must be concurrent with the subsequent steps because the oscillator phase movement is very time dependent and one must therefore capture the specific phase trajectory that occurs while awaiting and receiving the echo signal.)

In step 820, the device may transmit, at a transmission time, a ranging signal toward a particular satellite (e.g., a GEO, MEO, or LEO satellite), such as a licensed satellite or unlicensed satellite. As noted above, the reference satellite may be the particular satellite or may be different from the particular satellite (e.g., where the device has a two-antenna system to receive the reference signal and the returned ranging signal generally simultaneously).

Later, in step 825, the device may then receive, at a reception time, a return of the ranging signal from the particular satellite (an echoed signal). As such, in step 830, the device may then determine a round trip time (RTT) of the ranging signal by accounting for a phase drift of the internal oscillator between the transmission time and the reception time according to the measured phase delta over time. Specifically, in one embodiment as described above, the device may account for and compensate for the phase drift by the internal oscillator by adjusting a phase of the internal oscillator (or the phase of the received signal) so that a phase of the decoded ranging signal remains stable, facilitating the integration over time of the decoded signal. Note that accounting for the phase drift by the internal oscillator may comprise either adjusting the phase of the oscillator or adjusting the phase of the received signal, each before performing the demodulation of received echoed signal. Illustratively, in one embodiment, the device may initialize an adjustment based on an estimate of the RTT according to an altitude of the particular satellite, while in another embodiment, the device may initialize an adjustment based on an approximate location of the device and a direction of toward the particular satellite (e.g., where the direction is an angle between a line of sight from the device to the particular satellite and a horizon). Furthermore, in one embodiment herein, the device may adjust the phase of the signal from the internal oscillator based on improvements in adjustment until no further significant improvements are made, as described in greater detail above.

The simplified procedure 800 then ends in step 835. Note that other steps and details may also be included generally within the procedure above. For instance, the device (or, notably, another device that obtains the RTT) may further determine a distance between the device and the particular satellite based on the RTT, and may determine a location of the device based on the distance and a known location of the particular satellite (e.g., based further on distances from a plurality of other satellites), or may determine a location of the particular satellite based on the distance and a known location of the device. Note that while FIG. 8 describes phase adjustments to the signal of the oscillator, in another example implementation the phase corrections may be made to the received signal with the same result. That is, in particular, step 830 above may use the stored phase delta to adjust the phase of the received signal or may use the stored phase delta to adjust the phase of the oscillator, which is used to demodulate the signal from the oscillator.

It should also be noted that the steps shown and described in the flowcharts/procedures above are merely examples for illustration, and certain other steps may be included or excluded as desired. For instance, as mentioned above, other steps and details may also be included generally within procedures above as described herein. Further, while a particular order of the steps is shown, this ordering is merely illustrative, and any suitable arrangement of the steps may be utilized without departing from the scope of the embodiments herein. Moreover, while procedures may be described separately, certain steps from each procedure may be incorporated into each other procedure, and the procedures are not meant to be mutually exclusive.

Figure 9:
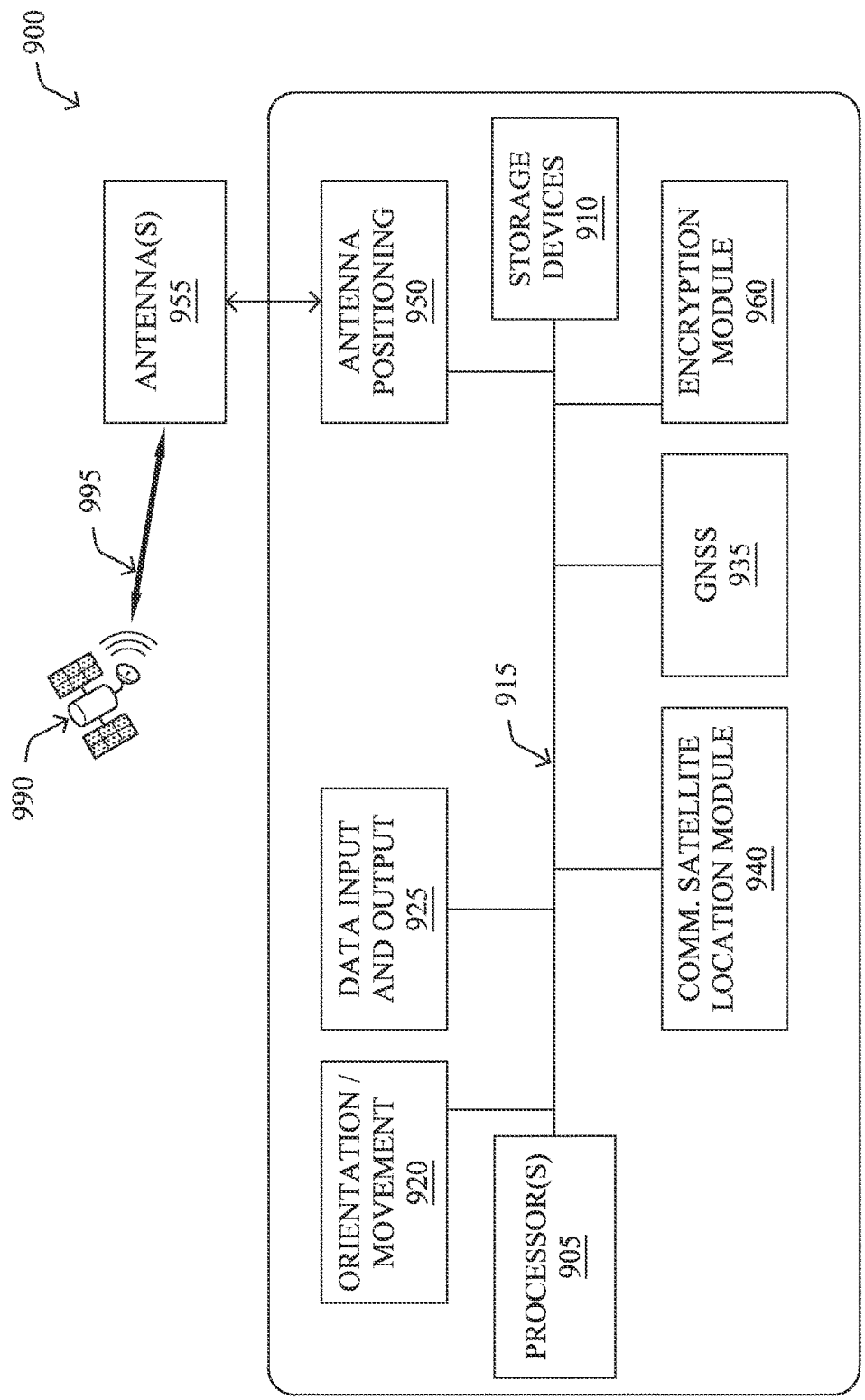
FIG. 9 illustrates an example simplified block diagram of a computing device in accordance with one or more embodiments described herein.

FIG. 9 is an example drawing of a computing device 900 in accordance with one or more embodiments herein. In particular, the device 900 may be embodied as a mobile device 110/210 (e.g., a smartphone, GNSS receiver, vehicle, vessel, boat, aircraft, spacecraft, IoT device, inventory tracker, and so on), or a ground station 150 in certain embodiments (e.g., satellite communication teleport, building, command center, antenna array, etc.). The device 900 may also be embodied as a tethered device, such as having some or all components located within a single enclosure that relays information to another device connected via a communication link, or else where certain components are located in one enclosure (e.g., antennas and antenna positioning control). For example, the techniques herein may assist with underwater geolocation using such a tethered configuration from a submerged vessel.

The operation of device 900 is governed by the controller or processor(s) 905. The control may be, and often is, governed by software modules residing in the memory of storage device 910 or shown separately (e.g., hardware, software, firmware, or combinations thereof), where communication between the storage device, processor(s), and various modules is conducted over an internal communication bus 915.

Various orientation and/or movement sensors 920, such as gyros (gyroscopes), accelerometers, compasses, barometers, etc. may be used to determine general movement and orientation of the device 900, such as angle to the earth, degrees to true north, acceleration in a particular direction, and so on, in order to roughly track the location of a mobile device as well as to track the aim of antennas of the device.

Device 900 may also include a data input/output (I/O) module 925. The module 925 on a mobile device may be any combination of a microphone for entering a voice message, a keyboard for entering a text message, and a video camera for entering a video message, and a network connection for entering any type of received data. In accordance with another embodiment, the data entry module is a sensor such as an IoT device which produces data to be transmitted securely to another user such as a person, a server, or another device. Data I/O module 925 on a ground station, on the other hand, may be generally a computer network connection to send and receive data of any configuration, as well as internally generated data for mobile device tracking as described herein.

Optional GNSS module 935 may be used to determine the location of the device based on one or more GNSS technologies, such as GPS, Galileo, etc., using received signals from GNSS satellites, accordingly, as will be understood by those skilled in the art.

Communication satellite location module 940, on the other hand, may be used by the device 900 to complete any of the tasks detailed above for either determining an RTT and/or distance to a satellite, determining a device location, or for determining a location of a communication satellite, based on the numerous techniques detailed within the present disclosure.

The antenna positioning module 950 illustratively positions the antenna(s) 955 in the direction of a particular satellite 990, as described above for transmission and/or reception of signals 995. Notably, as described above, a communication satellite antenna for a mobile device may be a directional, wide-lobed antenna, illustratively of a mobile-sized form factor (e.g., handheld). On the other hand, an antenna for a ground station may be a large, multi-meter satellite dish. Notably, either antenna is respectively capable of transmitting and receiving wide bandwidth signals to achieve an exceptionally fine measurement of transit time to achieve the precision ranging results detailed above. Also, one antenna 955 may be used for communication (e.g., with GEOs), while another separate antenna 955 may be used for GNSS reception (e.g., GPS antenna), and the view is shown merely for simplicity.

The operation of directing the antenna towards a satellite can be one of physically moving the antenna 955 towards the selected satellite (e.g., one or more motors, gimbals, etc.), instructing the user of the device 900 to point the antenna towards the satellite, or changing the parameters of a phased array antenna to point the lobe of the antenna towards the selected satellite, or any other method resulting in pointing the antenna towards the selected satellite. Satellite 990 is similar to communication satellites 115, 215, and 405 above. In accordance with one embodiment, the signals 995 may be encrypted/decrypted using encryption module 960, where the specific encryption mechanisms may be adjusted on-demand as described above.

Other configurations of a computing device 900 may be used in accordance with the techniques herein, and FIG. 9 is merely an example of one implementation. For instance, more or fewer modules may be included, and certain modules may be embodied as software processes within storage device 910 for execution by the processor 905. As such, any module and/or process described herein may generally be referred to as a process for execution by a processor. For instance, when the computing device is the ground station, for example, certain computations may involve coordination between multiple computing devices, where the "process" comprises one or more coordinated components.

Figure 10B:
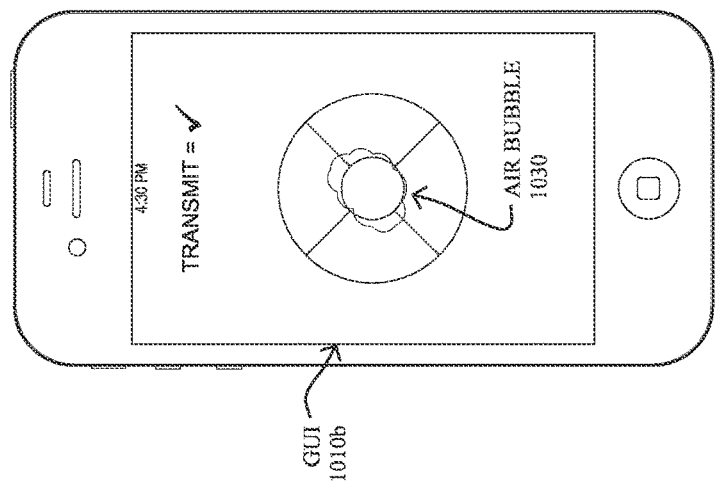
FIGS. 10A-10B illustrate examples of a graphical user interface (GUI) for use with one or more embodiments of the present disclosure.
Figure 10A:
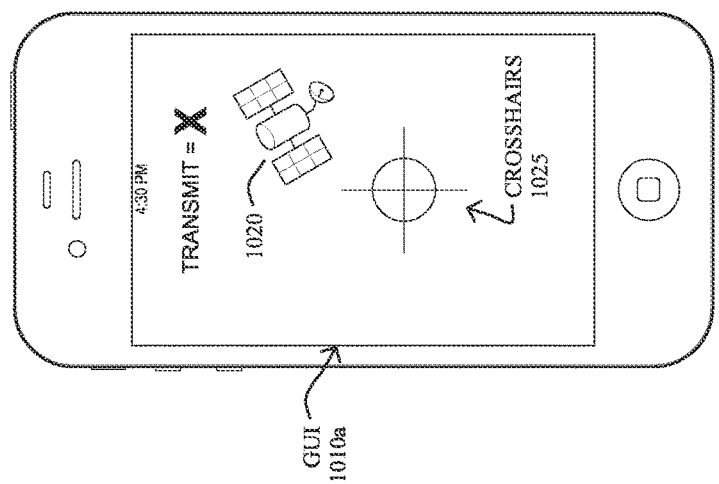

FIGS. 10A-10B illustrate examples of a GUI that may be used according to the techniques described above, particularly for user-based control of the directional antenna. In particular, FIG. 10A illustrates a first mobile device 1000*a* with an example augmented reality (AR) like GUI display 1010*a* with an AR satellite 1020 and stationary "crosshairs" 1025 to aim at the satellite, thus representing the desired direction to point the mobile device 110/210 (whether the satellite is actually located in that direction, or whether that merely represents the desired "aim" of the mobile device to direct the transmission or reception by the directional antenna according to the desired communication parameters). As shown, the mobile device is not pointing in the proper direction (i.e., the moving AR satellite 1020 is not within the crosshairs 1025 of the GUI 1010*a*), and thus the mobile device should not (or in certain instances, cannot) transmit, or may not be able to receive the desired signals from the intended satellite. Alternatively, FIG. 10B illustrates an example mobile device 1000*b* with an "air bubble" 1030 on GUI display 1010*b* to guide a user to point the device to the desired angle. As shown in FIG. 10B, the illustrative air bubble 1030 is "level", and as such, the terminal is appropriately aimed, and transmission and/or reception may commence. Many other types of GUIs and functionalities may be conceived, and those shown herein are not meant to be limiting to the scope of the present disclosure.

Notably, in other embodiments, such as where user intervention is not necessary for movement (e.g., automated terminals, drones/UAVs, etc.), the terminals may be re-aimed, repositioned, moved, elevated, etc., based on terminal-directed or server-directed commands according to the adjusted communication parameters as described herein. That is, no user-based GUI would be necessary to ensure proper adjustment/aim, where sensors and/or controls internal to the terminal would sufficiently and autonomously adjust the orientation of the terminal, accordingly.

Advantageously, the techniques herein provide for accurately determining a round trip time (RTT) to a satellite, particularly for determining the distance to such satellites. In particular, the techniques herein allow for low-cost frequency drifting oscillators to be used in satellite communication mobile devices, while still being able to accurately integrate returned echo messages. Note, too, that certain of the techniques herein may be used for echo-based positioning and navigation systems, particularly in a manner that is not dependent on receiving signals from traditional one-way GNSS satellites.

While there have been shown and described illustrative embodiments, it is to be understood that various other adaptations and modifications may be made within the scope of the embodiments herein. For example, the embodiments may, in fact, be used in a variety of types of wireless communication networks and/or protocols, and need not be limited to the illustrative satellite implementation. Furthermore, while the embodiments may have been demonstrated with respect to certain communication environments, physical environments, or device form factors, other configurations may be conceived by those skilled in the art that would remain within the contemplated subject matter of the description above.

Also, while there have been shown and described illustrative embodiments that relate to determining the location of a mobile device based on utilizing GEO satellites, it is to be understood that various other adaptations and modifications as well as utilization of other satellites can be used without any modifications to the techniques described herein (e.g., MEO, LEO, etc.).

Moreover, it is worth pointing out again that although certain units, data types, procedures, and equations may have been described above, other similarly functional alternatives may be used within the scope of the present disclosure, where applicable. For instance, while a procedure may discuss manipulating distances to create a computed result, a suitable alternative may be to manipulate times of flight to create a computed result prior to converting that result into a distance. Other alternatives to determining a "distance" may comprise determining a "measure of distance", such as time of travel of a signal, time of arrival of a signal, phase of arrival of a signal, and so on. Still other alternatives may also exist herein, as will be appreciated by those skilled in the art, such as detecting spoofing based on outlier distances as opposed to outlier locations, and so on.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Also, in one embodiment, an illustrative tangible, non-transitory, computer-readable medium according to one or more embodiments of the present disclosure may store program instructions that cause a computer (processing device) to execute a process comprising: receiving a reference signal with a stable phase; measuring a phase delta over time between the reference signal and an internal signal of an internal oscillator of the processing device; transmitting, at a transmission time, a ranging signal toward a particular satellite; receiving, at a reception time, a return of the ranging signal from the particular satellite; and determining a round trip time (RTT) of the ranging signal that accounts for a phase drift by the internal oscillator between the transmission time and the reception time according to the measured phase delta over time.

Further, in one embodiment, an illustrative apparatus according to one or more embodiments of the present disclosure may comprise: a processor configured to execute one or more processes; a communication interface configured to communicate via one or more satellite antennas associated with the apparatus; an internal oscillator; and a memory configured to store a process executable by the processor, the process, when executed, configured to perform a process comprising: receiving a reference signal with a stable phase; measuring a phase delta over time between the reference signal and an internal signal of the internal oscillator; transmitting, at a transmission time, a ranging signal toward a particular satellite; receiving, at a reception time, a return of the ranging signal from the particular satellite; and determining a round trip time (RTT) of the ranging signal that accounts for a phase drift by the internal oscillator between the transmission time and the reception time according to the measured phase delta over time.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
  receiving, at a device, a reference signal with a stable phase;
  measuring, by the device, a phase delta over time between the reference signal and an internal signal of an internal oscillator of the device;
  transmitting, by the device at a transmission time, a ranging signal toward a particular satellite;
  receiving, by the device at a reception time, a return of the ranging signal from the particular satellite; and
  determining, by the device, a round trip time (RTT) of the ranging signal that accounts for a phase drift of the internal oscillator between the transmission time and the reception time according to the measured phase delta over time.

2. The method as in claim 1, wherein the reference signal is from a reference satellite selected from a group consisting of: a licensed satellite; the particular satellite; a reference satellite that is different from the particular satellite; and a Global Navigation Satellite System (GNSS) satellite.

3. The method as in claim 1, wherein the reference signal is a beacon message.

4. The method as in claim 1, wherein the particular satellite is selected from a group consisting of: a geosynchronous equatorial orbit (GEO) satellite; a medium earth orbit (MEO) satellite; and a low earth orbit (LEO) satellite.

5. The method as in claim 1, further comprising:
  storing the determined phase drift of the internal oscillator over time as a time series within a buffer.

6. The method as in claim 5, wherein a size of buffer is longer than an anticipated RTT to a furthest reachable satellite.

7. The method as in claim 1, further comprising:
  accounting for the phase drift by the internal oscillator by adjusting a phase of the internal oscillator so that a phase of a decoded signal used for the return of the ranging signal remains stable facilitating integration over time of the decoded signal.

8. The method as in claim 7, wherein accounting for the phase drift by the internal oscillator comprises: adjusting the phase of the oscillator before demodulation of the ranging signal.

9. The method as in claim 7, wherein accounting for the phase drift by the internal oscillator comprises: adjusting the phase of the received signal before demodulation of received echoed signal.

10. The method as in claim 7, further comprising:
  initializing an adjustment based on an estimate of the RTT according to an altitude of the particular satellite.

11. The method as in claim 7, further comprising:
  initializing an adjustment based on an approximate location of the device and a direction of toward the particular satellite.

12. The method as in claim 7, further comprising:
  adjusting the phase of the internal oscillator based on improvements in adjustment until no further significant improvements are made.

13. The method as in claim 1, further comprising:
  triggering the measuring of the phase delta over time to cover at least a length of time between the transmission time and the reception time.

14. The method as in claim 1, further comprising:
  determining by the device a distance between the device and the particular satellite based on the RTT.

15. The method as in claim 14, further comprising:
  determining a location of the device based on the distance and a known location of the particular satellite.

16. The method as in claim 15, wherein determining the location is based further on distances from a plurality of other satellites.

17. The method as in claim 14, further comprising:
  determining by the device a location of the particular satellite based on the distance and a known location of the device.

18. The method as in claim 1, wherein the particular satellite is an unlicensed satellite.

19. A tangible, non-transitory, computer-readable medium storing program instructions that cause a computer on a processing device to execute a process, the process comprising:
  receiving a reference signal with a stable phase;
  measuring a phase delta over time between the reference signal and an internal signal of an internal oscillator of the processing device;
  transmitting, at a transmission time, a ranging signal toward a particular satellite;
  receiving, at a reception time, a return of the ranging signal from the particular satellite; and
  determining a round trip time (RTT) of the ranging signal that accounts for a phase drift of the internal oscillator between the transmission time and the reception time according to the measured phase delta over time.

20. An apparatus, comprising:
  a processor configured to execute one or more processes;
  a communication interface configured to communicate via one or more satellite antennas associated with the apparatus;
  an internal oscillator; and
  a memory configured to store instructions executable by the processor to perform a process comprising:
    receiving a reference signal with a stable phase;
    measuring a phase delta over time between the reference signal and an internal signal of the internal oscillator;
    transmitting, at a transmission time, a ranging signal toward a particular satellite;
    receiving, at a reception time, a return of the ranging signal from the particular satellite; and
    determining a round trip time (RTT) of the ranging signal that accounts for a phase drift of the internal oscillator between the transmission time and the reception time according to the measured phase delta over time.

* * * * *